US008481603B2

(12) United States Patent
Yilmaz et al.

(10) Patent No.: US 8,481,603 B2
(45) Date of Patent: Jul. 9, 2013

(54) METHODS FOR MAKING POLYMER BEADS (75) Inventors: Ecevit Yilmaz, Bjärred (SE); Johan Billing, Lund (SE)

(73) Assignee: Biotage AB (SE)

(*) Notice: Subject to any disclaimer, the term of this patent is extended or adjusted under 35 U.S.C. 154(b) by 719 days.

(21) Appl. No.: 12/085,260

(22) PCT Filed: Dec. 6, 2006

(86) PCT No.: PCT/SE2006/050545
§ 371 (c)(1),
(2), (4) Date: Feb. 17, 2009

(87) PCT Pub. No.: WO2007/067140
PCT Pub. Date: Jun. 14, 2007

(65) Prior Publication Data
US 2010/0029794 A1    Feb. 4, 2010

(30) Foreign Application Priority Data

Dec. 7, 2005  (SE) ....................... 5026984
May 3, 2006   (SE) ....................... 6009716

(51) Int. Cl.
*C08J 9/26*     (2006.01)
*C08J 9/00*     (2006.01)

(52) U.S. Cl.
USPC .................. 521/61; 521/91; 521/63

(58) Field of Classification Search
USPC ................................. 521/63, 91, 61
See application file for complete search history.

(56) References Cited

U.S. PATENT DOCUMENTS

| 4,279,752 A | * | 7/1981 | Sueoka et al. | 210/500.22 |
| 4,933,372 A | * | 6/1990 | Feibush et al. | 521/91 |
| 5,130,343 A |   | 7/1992 | Frechet et al. | |
| 5,288,763 A | * | 2/1994 | Li et al. | 521/61 |

FOREIGN PATENT DOCUMENTS

| KR | 10-2004-0054346 | * | 6/2004 |
| WO | WO-00/00278 A1  |   | 1/2000 |
| WO | WO 01/32760     | * | 5/2001 |
| WO | WO-01/32760 A1  |   | 5/2001 |
| WO | WO-2004/003043 A1 | | 1/2004 |

OTHER PUBLICATIONS

Jiang et al. "Template Directed Preparation of Macroporous Polymers with Oriented and Crystalline Arrays of Voids." Nov. 30, 1999. Journal of the American Chemical Society. 1999, vol. 121, pp. 11630-11637.*

(Continued)

*Primary Examiner* — Randy Gulakowski
*Assistant Examiner* — Kara Boyle
(74) *Attorney, Agent, or Firm* — Schwegman Lundberg & Woessner, P.A.

(57) ABSTRACT

The present invention relates to a polymer bead material that are characterised by having pore sizes that can be pre-determined and that can be obtained with a narrow distribution of such pore sizes created by use of sacrificial filler materials within the polymer material. The invention also discloses processes for production of the material as spherical or approximately spherical beads or resins with predefined sizes. Also, the invention relates to the preparation of molecularly imprinted polymer materials that are created by the said method. Further the invention relates to the use of said polymer materials for separation, detection, catalysis or entrapment of chemicals, metal ions, inorganic compounds, drugs, peptides, proteins, DNA, natural and artificial polymers, natural or artificial compounds, food or pharma products, viruses, bacteria, cells and other entities.

19 Claims, 4 Drawing Sheets

OTHER PUBLICATIONS

Apperson et al., "Nanoparticle metrology standards based on the time-resolved fluorescence anisotropy of silica colloids." 2009. Measurement Science and Technology. vol. 20 (2009). p. 1.*

Velev et al. "Colloidal crystals as templates for Porous Materials." Current Opinion in Colloid and Interface Science 5 (2000) 56-63.*

PCT Application No. PCT/SE2006/050545, International Search Report mailed Nov. 27, 2007, 4 pgs.

PCT Application No. PCT/SE2006/050545, Written Opinion mailed Nov. 27, 2008, 8 pgs.

Jang, J., et al., "A Simple Synthesis of Mesoporous Carbons with Tunable Mesopores Using a Colloidal Template-Mediated Vapor Deposition Polymerization", *Chem. Commun.*, (2005),4214-4216.

Jang, J., et al., "Selective Fabrication of Carbon Nanocapsules and Mesocellular Foams by Surface-Modified Collodial Silica Templating", *Adv. Mater.*, 14(19), (2002), 1390-1393.

Jiang, P., et al., "Template-Directed Preparation of Macroporous Polymers with Oriented and Crystalline Arrays of Voids", *J. Am. Chem. Soc.*, 121, (1999),11630-11637.

Johnson, S. A., et al., "Ordered Mesoporous Polymers of Tunable Pore Size from Colloidal Silica Templates", *Science*, 283(5404), (1999),963-965.

Maier, N. M., et al., "Enantioselective Anion Exchangers Based on Cinchona Alkaloid-Derived Carbamates: Influence of $C_8/C_9$ Stereochemistry on Chiral Recognition", *Chirality*, 11, (1999),522-528.

Masuda, T., et al., "High-Performance Liquid Chromatographic Separation of Carbohydrates on Stationary Phases Prepared from Polystyrene-Based Resin and Tertiary Amines—Effect of Chemical Structure of Anion-Exchange Sorbents", *Journal of Chromatography, A*, (1999),401-408.

Mattiasson, B., et al., "Affinity Precipitation of Proteins: Design Criteria for an Efficient Polymer", *Journal of Molecular Recognition*, 11, (1998),211-216.

Sellergren, B., "Imprinted Dispersion Polymers: A New Class of Easily Accessible Affinity Stationary Phases", *Journal of Chromatography A*, 673, (1994),133-141.

Ugelstad, J., et al., "Absorption of Low Molecular Weight Compounds in Aqueous Dispersions of Polymer-Oligomer Particles", *Die Makromolekulare Chemie*, 180, No. 3, (1979),737-744.

* cited by examiner

METHODS FOR MAKING POLYMER BEADS

This application is a U.S. National Stage Filing under 35 U.S.C. 371 from International Application No. PCT/SE2006/050545, filed Dec. 6, 2006 and published in English as WO 2007/067140 A1 on Jun. 14, 2007, which claims the benefit of Sweden Application No. 0502698-4, filed Dec. 7, 2005, and Sweden Application No. 0600971-6, filed May 3, 2006, which applications and publication are incorporated herein by reference in their entirety.

Figure 1:
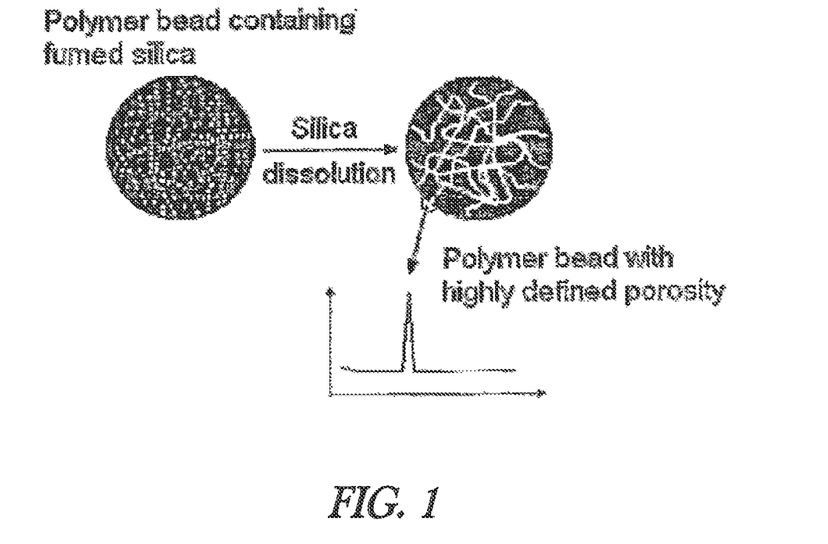
FIG. 1 illustrates the preparation of polymer material by the methods of the invention with pores obtained by incorporation of a colloidal silica, polymerization and removal of colloid. The pore size distribution of the final polymer bead is idealized in the graph and should correspond to the size distribution of the colloidal silica.

The present invention relates to a polymer material that is characterised by having pore sizes that can be pre-determined and that can be obtained with a narrow size distribution created by use of sacrificial filler materials within the polymer material (FIG. 1). The invention also relates methods for preparing the material as spherical or approximately spherical beads (or resins) with predefined sizes. Furthermore the invention relates to the use of said polymer materials for separation, detection, catalysis or entrapment of chemicals, metal ions, inorganic compounds, drugs, peptides, proteins, DNA, natural and artificial polymers, natural or artificial compounds, food or pharma products, viruses, bacteria, cells and other entities.

TECHNICAL BACKGROUND

In the fields of biomolecules, pharmaceuticals, food compounds, chemicals, bioelectronics and others, a wide and diverse selection of separation materials is used. These materials range from polymeric materials such as those derived from organic monomers as styrene and divinylbenzene or those based on biopolymers such as agarose or cellulose, to inorganic materials such as those based on silica or hydroxyapatite.

The advantages of inorganic materials, such as silica beads, are their mechanical stability and their highly defined pore structure. For example, the pore size of silica material extensively used for separations in numerous industries, is well defined and has a pore size distribution close to the theoretical or perhaps practical attainable limit. It is generally known that the ability of inorganic materials, such as silica, to organize into highly structured assemblies is much more pronounced than in organic materials.

The importance of pore size distribution and its impact on separation efficiency is described in the Van Deemter equation. One component of this equation:

$$H_m = \omega d_p^2 \cdot v / D_m$$

relates to the mass transfer effect on efficiency of separation ($H_m$) to particle size ($d_p^2$), flow velocity (v), diffusion coefficient of the analyte in the mobile phase ($D_m$) and a coefficient related to pore size distribution and shape ($\omega$). This relationship predicts that as $\omega$ gets smaller (narrower pore size distribution), $H_m$ gets smaller (i.e. lower plate height which leads to better separation efficiency). It is well known in the separations industry and is particularly important for separations based on molecular mass, i.e. Stokes radius, such as the separation of peptides, proteins and other oligo- or macro-molecules. Thus, pore size distribution is a key parameter, but it is typically only controllable with any certainty by the use of inorganic resin materials, such as porous silica (see FIG. 2A). Particularly in filtration materials the 'regularity' of pore size has been reported to be of great importance. Well defined pore shapes and size enables the filtration process to be selective for particular molecules leading to sharp exclusion limits and high resolution.

Pores are classified according to their diameters, where micropores have diameters less than about 2 nm, mesopore have diameters within the range of about 2 nm to about 50 nm and macropores have diameters greater than about 50 nm.

Although porous silica may yield highly defined spherical or approximately spherical beads, a disadvantage of silica based materials is their well-known instability towards alkaline conditions, often applied in the regeneration steps carried out between separation steps. For example, in protein biopharmaceutical purification, C18 silica is typically used in a final 'polishing' separation step. After a small number of protein purification cycles, typically 2, a wash with concentrated sodium hydroxide is usually carried out to remove protein residue and other undesirable materials bound to the chromatographic column that may cause fouling. This wash procedure is often required to conform to certain regulatory requirements, e.g. FDA. The lifetime of such silica beads and their prolonged use in such processes is thus limited. Since the silica that has been degraded by this washing process has to be regularly replaced by new silica, this represents a considerable cost factor for the user. An additional limitation is seen where the separation of basic compounds (many pharmaceutical drugs are 'basic') on reversed phase silica columns is contemplated since alkaline conditions are required to be non-charged compounds in order for them to interact with the hydrophobic surface.

Silica is also known to expose undesired chemically active sites on its surface. Despite these limitations, silica is a widely used separation material, mainly due to its strong mechanical stability and absence of swelling in solvents. Furthermore, the highly ordered pore structure contributes to high separation efficiencies.

In recent years, polymeric separation materials have replaced silica in more and more purification processes. This is mostly due to the improved stability and extended lifetime of these stationary phases. For example, styrene-divinylbenzene based stationary phases are more and more common because they are far more stable during the regeneration steps than silica stationary phases.

However, a major drawback of such polymer materials is that their pore size properties are a) not well defined and b) not easily controlled in the preparation process. Commercially available polymeric bead materials of this type (e.g. from Rohm & Haas (Netherlands) or PolymerLabs (UK)) display pore sizes that are much less well defined than equivalent separation materials based on inorganic materials, such as silica, and they frequently also contain a portion of small pores which may be disadvantageous for demanding separations (illustrated in FIG. 2B). Furthermore, the polymer bead materials derive their macroporosity from the use of porogens and have cross-linking densities typically around 20%. Due to these relatively low cross-linking levels the polymer beads will possess low mechanically stability and may exhibit variable swelling behaviour depending on the solvent system used.

Typically, porogens are organic solvents, such as toluene or dichloromethane, that control the porosity during the polymerization of monomers.

For example, during the synthesis of cross-linked polystyrene, pores are formed in the polymer network in the presence of a solvent or porogen. A cross-linking density below 20% usually leads to small pore sizes in the lower nm range (2-5 nm). Such pores are fairly uniform but the polymer is more like a gel and exhibits only a limited mechanical stability, resulting in compression and collapse of the material upon pressure. Also, micropores (i.e. pores smaller than 2 nm) present in the polymer may not be desirable for certain applications. Ideally, to obtain pressure-stable materials and materials that are less prone to swelling in certain solvents, the percentage of cross-linking should be increased. However, if the cross-linking density exceeds a certain value, e.g. 20%, the polymer will become inhomogeneous and large so-called macropores will be produced having a typical size range of 20-50 nm. These pores are irregular and may terminate inside the polymer matrix, leading to poor diffusion and flow-through properties. As a general rule, by using porogens to form pores, the small pores may be quite uniform but the remaining pores will tend to have a broad size range, particularly in polymers having large average pore sizes.

Commercial separation materials, such as Amberlite (Rohm and Haas) or PLRP-S media manufactured by Polymer Laboratories (UK) are typical examples of such conventional macro-porous polymers that feature amorphous internal structures characterized by irregular pores. An example of the experimentally measured pore size distribution of such materials is illustrated in FIG. 2B.

To address some of the above issues, Feibush (U.S. Pat. No. 4,933,372) disclose a process, in which the pore properties of highly defined silica particles are imaged in polymeric beads. In this process silica particles were filled with monomers and then polymerized. This could be carried out, for example, in an aqueous suspension system where hydrophobic monomers were dispersed in water along with hydrophobic silica particles. Through thermodynamically driven partitioning, the monomers accumulated inside the silica beads. After polymerization, the silica-polymer composite was then subjected to a harsh fluoride or hydroxide wash to remove the silica backbone. As a result of this process, polymer beads representing a mirror image of the silica beads were produced. These beads corresponded in size to the starting silica particles—the bulk of the polymer existed where the pores were previously present in the silica while the polymer pores corresponded to the dissolved silica walls.

Even though this method of Feibush led to some desirable properties in the resulting polymer beads, the complexity of its production process with the associated poor cost-benefit factors precluded its widespread use. The current cost of such premium silica materials lies in the range of a few thousand € per kg material. In contrast, the non-porous particles required to prepare the separation material, according to the present invention, costs only a few € per kg.

In a further development, Mallouk et al (Johnson S A., Ollivier P J. and Mallouk T E., Ordered mesoporous polymers of tunable pore size from colloidal silica templates. Science, 1999, 283, 963-965) used colloidal silica to create porous polymer materials. More precisely, a pellet made from dry colloidal silica was made by means of a pellet press. The pressed pellet was then used as a mould; the pellet was produced under a very high pressure of 10000 kPa and at extremely high temperatures, namely 800° C. The process of producing materials under high pressure and heat is termed sintering. A tabular pellet with the dimensions 0.7 cm in diameter and 0.3 cm thickness was obtained. The sintering step was performed with the aim of creating a network of connected colloidal silica particles. The sintered silica particles formed a three-dimensional, interconnected network of colloidal silica. Into this sintered pellet, a monomer solution was used to fill the void spaces between the silica particles and then polymerized. Filling the voids of this interconnected network with monomers, followed by polymerization and subsequent removal of the colloidal silica yielded a continuous porous system in the final polymer. The publication by Mallouk also shows that the pores obtained have a relatively narrow distribution and correspond to a certain extent to the original colloidal silica. However, the work carried out by Mallouk's group does not disclose a process to produce spherical or approximately spherical polymer material useful for common separation or purification applications. In contrast, it provides a cumbersome method of composite formation that is not amenable to any large-scale or industrial process. The colloidal silica used in this work is obtained by a work-intensive sol-gel process including an emulsion of tetraethyl orthosilicate, and the process requires at least 2 days until the final product is obtained (further details are described in K Osseo-Asare & F J. Arriagada, Colloids Surf. 50, 321, 1990).

Sueoka et al (U.S. Pat. No. 4,279,752) disclose the preparation of a porous membrane in which fine silica particles (size 0.01 µm) are admixed. The membranes consist of polyvinyl alcohol that is extruded through a slid die into a coagulation bath and the obtained membrane is then further processed with a cross-linking treatment in another bath. In a third bath, the silica is extracted and the membrane is then washed. The obtained membranes have uniform pore sizes around 1 µm as opposed to the size of the pore forming silica (0.01 µm). The document indicates that the fine silica particles aggregate during the admixture process. The material disclosed by Sueoka et al is not useful as a chromatographic packing material, i.e. it does not have the form of beads.

The publication by Derylo-Marczewska et al (Langmuir, 2002, 18, 7538-7543) discloses the use of fumed silica for the preparation of melamine-formaldehyde resins. From the synthetic details, it can be concluded that a bulk material in the form of a block is prepared. The material disclosed by Derylo-Marczewska et al will not be useful as a chromatographic packing material, i.e. it does not disclose beads. Even though the pore size distribution displays a main peak, it also displays a large portion of micropores and it contains other population of pore sizes. Consequently the block material disclosed does not have a uniform pore size distribution. The micropores may be disadvantageous in chromatographic separations leading to undesirable chromatographic effects and ill-defined peak shapes such as peak tailing.

Li et al (U.S. Pat. No. 5,288,763) disclose the preparation of porous polymer particles based on a template polymerization technique. As template, a linear polymer, polyacrylic acid (PAA) is used, which is dissolved in a monomer mixture containing an initiator. Furthermore after dissolution of the PAA monomer mixture it is filtered to remove any insoluble matter. Disclosed is a soluble template, namely PAA, used to create a part of the pores. The obtained particles are argued to have a narrow pore size distribution, which is not disclosed in the reference. The obtained pore size is larger than 1 µm and mentioned to be uniform in Table 1 (assessed by SEM observations as shown in FIG. 4-5) but without providing supporting data. Further, the obtained beads display both macroporous and microporous regions in their porosity. As Li et al state in their patent (column 1, line 47) micropores will lead to undesirable chromatographic effects and ill-defined peak shapes such as peak tailing.

The work by Asher and Liu (WO 0000278 A1) discloses a process wherein a colloidal silica is mixed with water soluble monomers and then polymerized between two quartz plates. The resulting material is a flat sheet with a typical thickness of 0.1 mm. It contains both large voids and smaller pores and does not display a defined porosity. Furthermore, beads are not disclosed.

In chromatography there is a need for a packing material having the form of beads and a narrow pore size distribution, without micropores, which material is amenable to large scale production by an economical method.

SUMMARY OF THE INVENTION

The object of the present invention is to prepare polymer bead material where the pore size is possible to control, where the pores have a narrow size distribution, and wherein said polymer bead material is virtually free of micropores and wherein said polymer bead material is easily produced in large scale. Furthermore, the polymer bead material can be produced with cheap (commodity) starting materials. The object is achieved by a polymer bead material, which is obtainable by:
  a) providing, and optionally mixing, monomers and optionally porogens and optionally additives, in the presence of non-porous particles,
  b) dispersing the mixture in a dispersing medium, forming monomer droplets comprising the non-porous particles,
  c) polymerizing said monomer droplets comprising said non-porous particles,
  d) removing said non-porous particles from the formed polymer beads.

The thus obtained material is in a bead-like form, meaning mainly spherical, which material according to one object of the present invention may be used in separation; detection; catalysis; diagnosis; entrapment applications, such as entrapment of chemicals, such as metal ions, inorganic compounds, drugs, peptides, proteins, DNA, natural and artificial polymers, natural or artificial compounds, food or pharma products, viruses, bacteria, cells and other entities; or enrichment applications, such as chromatography, batch separations, sensor applications, filters, membranes, controlled release materials, catalysts, biomimetic materials, thermodynamic traps and entrapment matrices.

DESCRIPTION OF THE FIGURES

FIG. 2 (A-C) illustrates the pore size distributions of various beads, measured by nitrogen adsorption (BET) analysis. The beads that were investigated were A) a premium commercial silica, B) a premium commercial polystyrene-divinylbenzene (PS-DVB) polymer resin, and C) polymer beads according to the present invention.

DETAILED DESCRIPTION OF THE PRESENT INVENTION

The present invention relates to a polymer bead material obtainable by using non-porous particles as pore forming agents during a polymerization process wherein the particle size and particle distribution of the non-porous particles may be used to control the pore size and pore distribution in the obtained polymer bead material. The network of non-porous particles inside the polymer is created by a self-assembly process. According to the present invention conditions are created for the monomers to partition with the non-porous particles.

In one embodiment according to the present invention relates to a polymer bead material having a narrow pore size distribution (virtually free of micropores) obtainable by
  a) providing, optionally mixing, monomers and optionally porogens, optionally additives, in the presence of non-porous particles,
  b) dispersing the mixture in a dispersing medium, forming monomer droplets comprising the non-porous particles,
  c) polymerizing said monomer droplets comprising said non-porous particles,
  d) removing said non-porous particles from the formed polymer beads.

According to one embodiment step a) may be performed by mixing apolar monomers in the presence of apolar non-porous particles and dispersing in a polar medium (e.g. water or a polar solvent in which the monomers and non-porous particles are insoluble or immiscible) or mixing polar monomers in the presence of polar non-porous particles and then dispersing the mixture in hydrophobic medium (e.g. mineral oil in which the polar monomers and non-porous particles are insoluble or immiscible). In this context, dispersion is used in its general sense "Dispersion is uniform on a macroscopic scale but not on a microscopic scale. It consists of grains or droplets of one substance in a matrix of the other", (Atkins, P. W Physical Chemistry, $5^{th}$ Edn, Oxford University Press, p240). It is believed that the monomers partition with the non-porous particles in either case due to the fact that the non-porous particles and the monomers have chemical similarity or similar functionality that is different from the dispersion medium.

In a further embodiment, non-porous particles may be modified to carry either polar or apolar chemical functionalities on their surface which may then be mixed with polar or apolar monomers and the mixture dispersed in a medium which may be polar, apolar or a miscible mixture of polar and apolar media.

In yet another embodiment of the invention monomers could also partition with the non-porous particles in a semi-dry process by mixing solid monomers, a solvent for the monomers (for example, toluene for apolar monomers or acetonitrile for more polar monomers) and non-porous particles before polymerisation.

In one embodiment a semi-dry process may be performed by mixing a liquid monomer and non-porous particles before polymerization.

After polymerization, the colloidal particles inside the polymeric beads are removed leaving behind a network of pores or holes where the non-porous material previously had been. The properties of the non-porous particles, such as their size, size distribution and other chemical or physico-chemical parameters will determine the pore characteristics of the final polymer material. This is the way to control the pore size characteristics of the final polymer material, such as polymer beads, resins, membranes etc. The control of the pore characteristics is determined by the choice of the non-porous particles.

While colloidal particles are preferred to create pores in polymeric material, larger particles that are in the µm range can be envisaged. Such polymer beads with pore sizes in the µm range are useful for certain applications. For example, for the separation of large compounds, such as proteins, cells or other compounds, materials with pores in the μm range are preferable.

According to the present invention preferred non-porous particles are colloidal silica, latex, crystal molecules, biominerals or any other organic, inorganic or biological non-porous entity, or any mixture thereof. More preferred non-porous particles are colloidal particles, most preferred is colloidal silica, such as Aerosil R972 or R8200 (Degussa). The properties of the colloid particles are reflected in the final polymer pore characteristics. It is preferable that the colloids do not have an internal porosity. If a colloid is used that has a particle size of 100 Å, then the polymeric material will also have a pore size around 100 Å. But the final pore size of the polymer may vary as polymers may shrink or swell, characteristics that depend on the nature of the polymer used. If colloids are employed that have a very narrow particle size distribution, this will lead to pores in the polymeric bead that have the same or closely similar pore size distribution.

The non-porous particles may have different diameters. Thus they may comprise one or more populations of non-porous particles wherein each population have essentially the same diameter but different from another population.

The invention also relates to processes for production of polymer materials, such as spherical or approximately spherical beads or resins having predefined sizes. The present invention also relates to a process for the preparation of polymer material, e.g. polymer beads and resins, that exhibit a highly defined pore size distribution and where such material may be produced in spherical, flat, granular, layered or multi-component formats, if desired. The polymer material according to the present invention may also be prepared in other formats or shapes. A person skilled in the art may prepare formats or shapes that are useful as membranes, filters, tubes, composites, and other formats known to a person skilled in the art. Such shapes may be granules, monoliths, spheres, composite beads, rods, tubes, sheets, membranes, filters, hollow, layered or other multi-component assemblies.

The invention also relates to the use of said polymer materials for the separation, detection, catalysis or entrapment of chemicals, metal ions, inorganic compounds, drugs, peptides, proteins, DNA, natural and artificial polymers, natural or artificial compounds, food or pharma products, viruses, bacteria, cells and other entities.

In the present invention, colloidal particles, such as colloidal silica, may be used as a pore forming agent where pores are formed after the polymerization is complete and revealed by removing the silica with an appropriate agent, such as a base, e.g. sodium hydroxide. By this process, the pore formation is decoupled from the polymerization mechanism, the phase separation and the cross-linking, resulting in several advantages, such as being able to control, fine-tune and modify the desired pore characteristics of the polymer material. A further advantage of this process is that, while the colloidal silica is still present in the polymerized bead, any modification of the polymer bulk may be conducted without altering the final pore structure.

Figure 4:
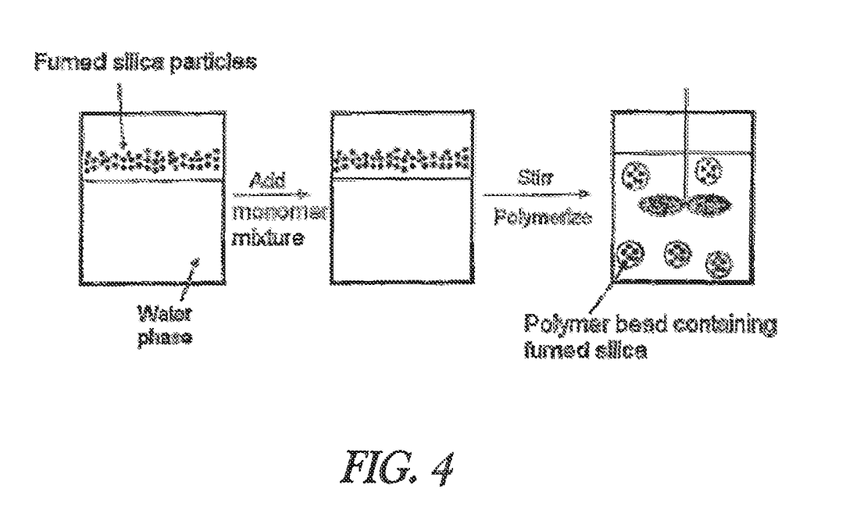
FIG. 4 illustrates schematically a suspension process for the preparation of polymeric beads that have colloidal particles incorporated in the process. When both colloidal particles and monomer solution are of hydrophobic nature, it will form a phase that is not miscible with the dispersing medium, water. Upon stirring, said phase that consists of monomer and hydrophobic colloid particles, will form droplets. After polymerization, colloid-polymer composite beads are obtained. Further processing yields porous beads.

Polymer beads or resins are easily obtained by producing said polymers in, for example suspension, condensation, bulk, emulsion, membrane emulsification, dispersion, precipitation, solution, grafting, surface or electropolymerization, or by swelling techniques. Such a process is depicted in FIG. 4 and yields spherical polymeric beads.

The colloidal particles to be used in the present invention may be chosen from the group consisting of fumed or colloidal silica, latex, crystal molecules, biominerals or any other organic, inorganic or biological colloidal entities. The colloidal particles may be hydrophobic in which case hydrophobic monomers would be selected, or hydrophilic in which case hydrophilic monomers would be selected, the dispersion medium being hydrophilic (e.g. water, alcohols, dimethylformamide, acetonitrile, dimethylsulfoxide, organic acids, organic bases and ketones, other polar organic solvents, or any mixtures thereof) or hydrophobic (e.g. mineral oil, aromatic or aliphatic cyclic compounds, alkanes such as heptane, petrolether, halogenated solvents or mineral spirits, or any mixtures thereof) respectively.

Preferred colloidal particles according to the present invention are colloidal silica particles with a hydrophobic surface such as Aerosil R972 and R8200. The colloidal particles may be a single type of a colloid or a mixture of different types of colloids. If an apolar monomer phase (e.g. divinylbenzene and styrene) is added to water or a water rich phase containing hydrophobic colloidal particles, the colloidal particles will enrich in the said apolar monomer phase due to thermodynamic partitioning. It has been suggested that particular colloids of relevance to the present invention form interconnected networks by simple self-assembly in appropriate environments.

According to the present invention "colloidal" is defined as described by P. W. Atkins, Physical Chemistry, $5^{th}$ ed., p 970.

By "self assembly" is understood that the colloidal particles and the monomers have chemical similarity or similar function that is different from the dispersion media. This chemical similarity or function makes them stick together attracting each other and avoiding or repelling the dispersion media. Thus for example the colloidal particles and the monomers may be hydrophobic, hydrophilic, polar, apolar or neutral whereas the suspension media correspondingly is hydrophilic, hydrophobic apolar, polar or charged. The present inventors have observed that hydrophobic colloidal silica that is produced by various methods (e.g. fumed silica, Degussa, Germany) works well in this process. When a monomer-silica mixture is stirred or otherwise agitated in water or a water rich medium droplets of monomer are formed with the hydrophobic colloidal silica inside the monomer droplets. The monomer droplets are then polymerized leading to a solidification of the droplets to form beads. Since the colloidal silica is embedded inside the polymer beads this material is then termed a silica-polymer composite.

Said silica-polymer composites can also be formed in a so-called semi-dry process. In this procedure the non-porous silica is mixed with the monomers and initiator and solvent if necessary and under appropriate agitation conditions (for example rolling—see Example 5) and polymerisation is carried out in a semi-dry process.

After completed polymerisation, removal of the incorporated silica from the polymer leaves behind a porous network of polymer. Removal of the incorporated silica can be performed by dissolution with appropriate solvents. These steps are schematically depicted in FIG. 1. The process is schematically depicted in FIG. 4. The relative sizes of the colloidal silica particles and the resulting polymer-silica composite beads are simplified and not intended to be to scale in FIG. 4 for a more convenient visual description. Because the silica is removed after it has fulfilled its function, being a filler inside the polymer, it can be looked upon as a sacrificial filler material. It is removed i.e. sacrificed for creation of pores. As the use of silica and its subsequent removal leaves pores behind in the polymer, they can be regarded as pore-forming agents.

Generally in the separations industry, polymerized droplets are termed polymer beads or sometimes resins. The terms "beads" and "resins" are used interchangeably within the present invention.

According to the present invention "polymer material" is intended to mean polymer beads or resins, or another material such as e.g. membrane, filters, tubes, composites, and other formats or shapes known to a person skilled in the art.

The terms "sacrificial non-porous filler" and "non-porous particles" are used interchangeably within the present invention and always mean the non-porous particles used to create the pore structure within the "polymer material".

In the present invention the terms "particles" and "filler" is used interchangeably. In the present invention, the term monomer includes both monomers and cross-linking monomers. Examples of monomers are styrene or methacrylic acid, examples of cross-linking monomers are divinylbenzene or methylenebisacrylamide.

Dispersion medium and continuous phase are used interchangeably in the present invention.

Figure 2A:
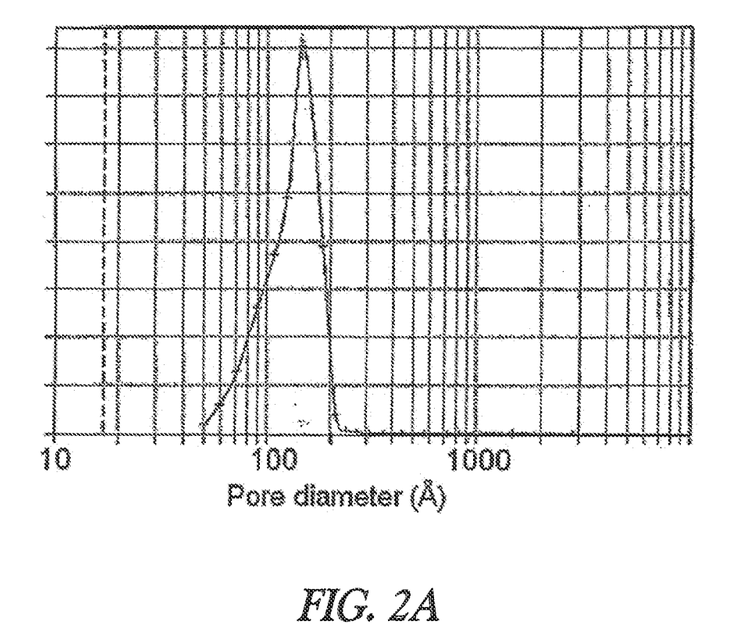
Figure 2B:
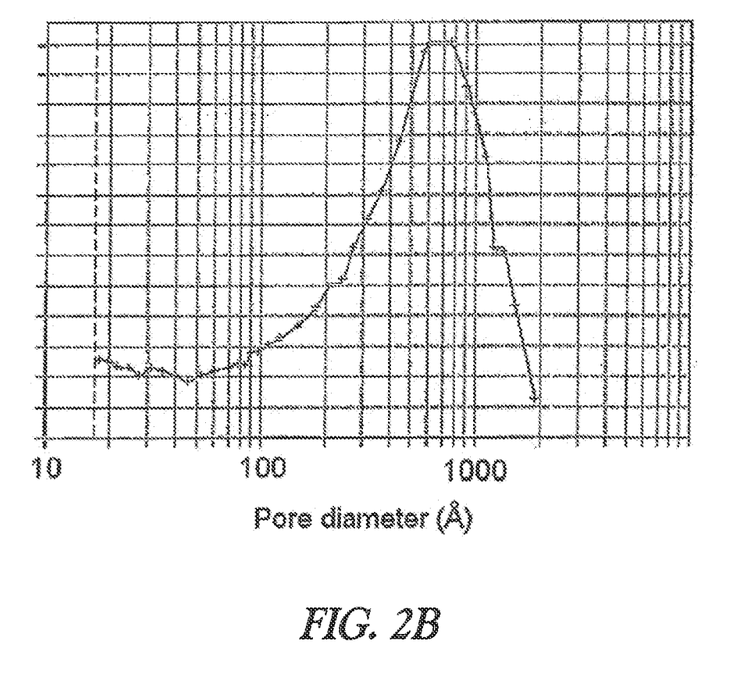
Figure 2C:
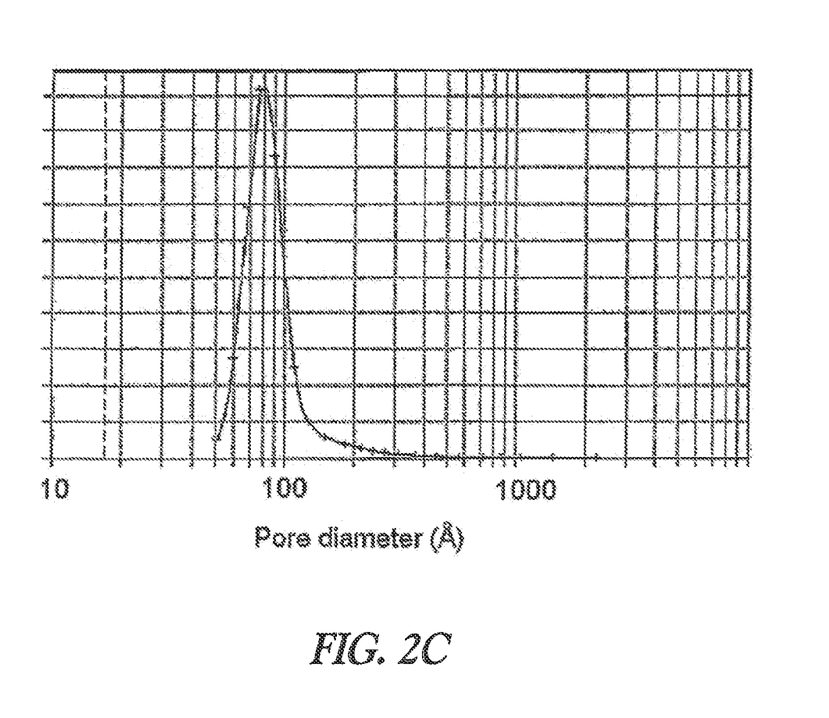
Figure 3:
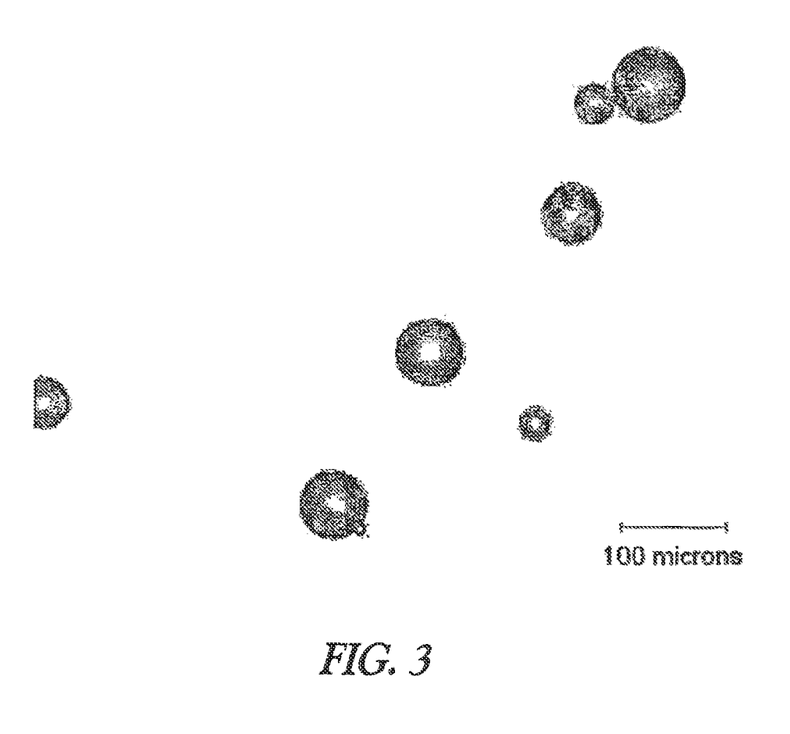
FIG. 3 illustrates photographic pictures of the polymer material according to the present invention, which are taken by a Light Microscope.

As used in the present invention the term "free of micropores" means predominantly free of micropores, e.g. as disclosed in FIG. 2c.

Colloidal silica can be obtained by sol-gel methods (K. Osseo-Asare & F J. Arriagada, Colloids Surf. 50, 321, 1990) and by other methods, such as flame hydrolysis. The colloidal silica is then termed fumed silica. Fumed silica particles are obtained in a flame hydrolysis process of a volatile silane compound in an oxygen-hydrogen gas flame. Such fumed silicas that are in the colloidal size range are for example manufactured and sold by Degussa (Germany) under the trade name Aerosil. The terms fumed silica and colloidal silica are interchangeable terms in the present invention. Colloidal silica is usually provided as dry powders.

Colloids or colloidal silica powders may be used, preferably with adapted and engineered surface and particle properties, such as hydrophobic or hydrophilic surface, which are transferred to the monomer mixture, and are incorporated into the polymer. After polymerization, the polymer is subjected to a wash that dissolves the silica and leaves behind an interconnected network of highly defined pores with a defined and narrow pore size variation, as is illustrated in FIG. 2 C.

As illustrated in FIG. 2 C, there is clear evidence for the highly defined and narrow pore size distribution in the beads of the present invention that is not obtainable for common polymeric resins, shown in FIG. 2 B. The pore size distributions of the novel materials are comparable to inorganic separation beads, such as silica shown in FIG. 2 A. Additionally the obtained bead is clearly free of any undesirable microporosity, i.e. pores that are smaller than 20 Å. As shown in FIG. 2 B, the commercial polymer bead has considerable levels of microporosity.

Preferred colloidal silica has a size ranges from low nm to low μm in diameter and preferably they exhibit a negligible or no internal porosity. These colloidal silicas can be either in their native form, displaying silanol groups, or they may be chemically modified as described by Maier et al (Maier N. M., L. Nicoletti, M Lämmerhofer, W Lindner, Chirality, 1999, 11, 7, 522-528) and as described in Example 1 and they may comprise neutral, acidic, basic, hydrophilic, hydrophobic, polymerizable, biomimetic or other functionalities on their surfaces. Furthermore, the surfaces of the silicas can be engineered to complement the monomer composition and the polymerization chemistry.

The amount of colloidal silica added to the monomer mixture may range from trace amounts to larger amounts and may have a maximum close to 99% by weight compared to the monomer solution.

When the weight percentage of silica is far above the weight percentage of the added monomer solution and there is no dispersing medium present, then this is termed semi-dry polymerization. Semi-dry polymerization represents a polymerization system, where the colloid-monomer mixture appears to be dry as all monomer is covered by silica colloids.

Optionally, additional agents/additives that control the compatibility of the colloidal silica with the monomer phase and also control the compatibility with other phases in the system may be added to improve the overall properties of the material. For example, surface active compounds (e.g. sodium dodecyl sulphate (SDS), Triton or similar amphiphilic compounds), amphiphilic polymers such as polyvinyl alcohol (PVA), polyvinlypyrrolidone (PVPy), or organic solvents may be added to improve the wetting of the silica, comprising hydrophobic monomers (or hydrophilic monomers in the inverse case). Other additives known to a person skilled in the art also may be envisaged.

Alternatively, compounds that decrease or increase the ability of silica to be suspended in the continuous phase may be added. Such compounds typically have the nature of amphiphilic agents or surfactants, and could include derivatives of silanes, alkanes, polymers, fatty acids, carbohydrates and other amphiphilic compounds.

Additionally, surface modification of the silica to increase its compatibility with monomer mixtures (e.g. styrene-divinylbenzene) may be contemplated. Such surface modifications may involve modification of the silica surface by incorporation of methyl, butyl, phenyl, octyl, styryl, methacryl or other similar functionalities.

According to the present invention molecularly imprinted polymers can be envisaged to be produced using colloids. In general, a molecularly imprinted polymer is produced by polymerizing monomers and cross-linkers in presence of a template in a solvent. After polymerization, the template is washed out to leave behind binding sites into which template and similar molecules can rebind with a certain specificity. As templates, peptides, proteins, hormones, drugs, metal ions, toxins, chiral compounds, virus, cells and any other chemical or biological entity can be envisaged.

In the literature (Sellergren, B, Molecularly Imprinted Polymers: Man made mimics of antibodies and their application in analytical chemistry. B. Sellergren (Ed.) Elsevier publishers, 2001 (22 chapters, 550 pages), many examples are presented and the person skilled in the art can envisage any type of template.

According to the present invention polymer monomers are usually derived from vinylic, styrenic or acrylic monomers. Preferred examples are 2-hydroxyethylmethacrylate, allyl dextran, N-vinylpyrolidone, acrylamide, methacrylamide, glycerol-1-acrylate, or glycerol-1-methacrylate, 2- or 4-vinyl-pyridine, N,N-diethylaminoethyl methacrylate, methacrylic acid, methylmethacrylate and styrene, and cross-linking monomers such as ethylene glycol dimethacrylate, divinylbenzene, trimethylolpropane tri-methacrylate, pentaerythritol triacrylate and N,N'-methylene-bisacrylamide, or any other polar, non-polar, ionic, hydrophilic or hydrophobic monomers or cross-linkers, or a mixture thereof. Further monomer candidates are widely described in the literature e.g. in the molecular imprinting textbook edited by Sellergren (Sellergren, B, Molecularly Imprinted Polymers: Man made mimics of antibodies and their application in analytical chemistry. B. Sellergren (Ed.) Elsevier publishers, 2001 (22 chapters, 550 pages)) and are available from commercial sources or can be tailor-made to suit the application.

Furthermore, preparation of beads comprising agarose, dextrane, cellulose or other biopolymers is possible according to the present invention.

In other applications, the polymer formulation may contain responsive or reporter properties in the polymers, which enables it to react to changes in the environment, such as temperature, pH, salt concentrations and other parameters, or respond to a binding effect. Some monomers and polymers that comprise such responsive effects are described in the literature, e.g. by Mattiasson et al (B. Mattiasson, A. Kumar and I. Yu Galaev, Journal of Molecular Recognition, 11, 211-216, 1998). Reporter groups could be for example fluorescent, or emit or influence another measurable signal that possible to use in diagnostic applications.

The materials can be prepared by in situ polymerization of the sacrificial non-porous filler, such as the above mentioned non-porous particles, such as silica, in a monomer solution or by incorporation into pre-formed oligomers or polymers. After incorporation the sacrificial non-porous filler is then dissolved by known methods, Feibush, U.S. Pat. No. 4,933,372, such as fluoride compounds and strongly alkaline or acidic chemicals. Agents that dissolve non-porous particles may be based on fluoride compounds such as hydrofluoric acid or ammonium hydrogen difluoride, various strongly alkaline chemicals based on hydroxides of sodium, potassium or tetramethylammonium or concentrated solution of acidic compounds, such as phosphoric acid. Generally, heating increases the efficiency of such compounds to remove silica.

One way of incorporating the sacrificial non-porous filler into the polymer is by simple addition to a liquid, a solution, an emulsion, an aerosol or a suspension. Alternatively, the sacrificial non-porous filler can be incorporated by admixing to a pre-formed material, by sintering or pressing, by injection moulding or other polymer processing methods. For example, the sacrificial non-porous filler could be admixed to polyethylene, polypropylene or other suitable commodity or specialty polymers and then processed to the desired format and then finally treated to remove the sacrificial non-porous filler to obtain structures that contain the desired porosity or pore properties.

The present invention also covers processes that yield uniformly sized polymer particles or beads. Processes for yielding uniform polymer beads using colloidal silica particles are suspension, emulsion, dispersion polymerization methods, membrane emulsifications and single or multiple swelling methods using, for example, monodisperse latex emulsions or similar formulations following the procedures of Ugelstad et al (Ugelstad, J.; Kaggerud, K. H.; Hansen, F. K.; Berge, A. Makromol. Chem. 1979, 180, 737-744) or as described by Frechet et al (U.S. Pat. No. 5,130,343). Particles that have a narrow (or uniform) particle size distribution are termed monodisperse.

According to one embodiment post-polymerisation treatment of the silica-polymer composite beads or resins can be envisaged in which the silica containing beads are 'soaked' in e.g. styrene, leading to (a) removal of residual non-reacted vinyl groups of monomers such as divinylbenzene; b) an increase the density of the beads and reduction of the levels of micropores; c) improved mechanical stability of the beads and d) incorporation of another material, with certain property.

According to one embodiment of the present invention the beads or resins according to the invention may also be prepared in the presence of either molecular or macromolecular templates, in order to impart a further dimension in separation ability. The molecular templates may either be a part of the polymerisation composition or may be present in a dissolved or dispersed form and can be removed after polymerization by solvent extractions and other washing or chemical treatment methods. Alternatively, the molecular templates can be covalently attached or associated with the colloidal silica particles and be removed together with the silica since they are coupled or associated to the silica carrier. For example, the silica surface modification may be a simple acidic group and a basic monomer in the monomer mixture may be used, which would then become part of the final bead. This would result in a basic anion exchanger resin with the ability to interact with acidic anions and when basic monomers are used they would be predominantly on the surface of the beads.

In one embodiment according to the present invention a basic moiety may be coupled to the colloidal silica and an acidic monomer used to obtain an acidic cation-exchanger resin. When more complex molecules, such as drugs, chiral molecules, carbohydrates, peptides or proteins or even living entities, are used as surface modifications of the colloidal particle, the functional monomer and crosslinkers and other reactants are adapted appropriately to yield polymeric resins with a defined affinity towards the coupled entity and similar compounds.

The polymerization may be initiated by any conventional and suitable initiator, preferred initiators are azo, peroxide, or other initiators, such as azoinitiators e.g. azobisisobutyronitrile (AIBN), benzoylperoxide, dimethoxyphenylacetophenone. The initiation can be via irradiation with heat or UV light, or chemically or catalytically. Any polymerization chemistry such as radical, condensation, ionic, electrochemical or ring-opening polymerizations can be envisaged. A person skilled in the art will realize other initiation chemistries and techniques.

Furthermore, the present invention is applicable to a wide range of polymerization methods, such as solution, multi-step swelling, dispersion, precipitation, and suspension or emulsion polymerization and may be performed in a homogenous solution or in heterogeneous phases, such as in an interphase, in an liquid-liquid interphase or in a liquid-solid interphase, on surfaces, and in combination with molecular, oligomeric, polymeric, macromolecular, dendritic, crystalline, biological or other additives in the polymerization system. A person skilled in the art will realize other polymerization chemistries and techniques and will realize other appropriate additives.

In polymerization systems that entail water as suspension medium, as illustrated in FIG. 4, a radical scavenger such as sodium nitrite can be added to the water phase to suppress undesired polymerization in the water phase. This decreases the amount of uncontrolled polymerizations in the water phase leading to small polymer fractions that are not useful as a stationary phase in common chromatography.

Once the silica or any other appropriate non-porous particles are copolymerised in the final polymer, the polymer has to be treated in order to remove the incorporated non-porous particles. In order to increase the accessibility to the incorporated non-porous particles, the beads may be treated with appropriate solvents that will swell the material. Such solvents are for example acetone, alcohols, chlorinated solvents, toluene or benzene, tetrahydrofuran or any other appropriate solvents that cause divinylbenzene-styrene resins to swell. Other polymers require other solvents that usually display a similar solubility parameter as the polymer. For example, biopolymers have high swelling rates in aqueous or polar solvents such as water, buffers or alcohols. After material swelling, the incorporated non-porous particles may be treated chemically or physically or otherwise to effect their removal.

According to the present invention incorporated non-porous particles may be removed according to their solubility or nature of stability or by any other means.

Once polymer materials are produced they can either be used as efficient size exclusion separation materials, simple, reverse phase materials, or, after modification, as ion exchange separation materials, e.g. as disclosed in the procedure of Masuda et al (Masuda, T.; Nishimura, Y.; Tonegawa, M.; Kitahara, K.; Arai, S.; Yamashita, J.; Takai, N. Journal of Chromatography A, 1999, 845, 401-408.). Additionally the functional groups may be utilized to bind or couple to other molecules in order to change the surface nature of the materials. For example, an antigen may be immobilised on the surface and consequently used as a separation material, resulting in a further dimension of selectivity. Of course, also other entities are possible to bind or attached to the surface of the polymer material according to the present invention, in order to attain engineered surface characteristics. In filter applications, the membranes, filters or other devices may be used to carefully control the filtration or diffusion of compounds of varying molecular sizes and hydrodynamic radii. This is especially important for dialysis membranes, size exclusion filters, and other size or shape selective applications, for which the present invention may be used.

According to one embodiment of the present invention the materials are loaded with pharmaceutically active ingredients and may then function as a controlled release material in pharmaceutical and medical applications.

In addition to the incorporation of pores originating from the dissolution of the small silica particles, it may be beneficial to create a second population of defined pores with larger diameters to modify mass transfer and diffusion properties. This is realized, according to one embodiment of the present invention, by either using a second non-porous silica material having a larger diameter, which creates a second class of flow-through or perfusion pores, or by addition of a highly ordered solid or semi-solid material into the mixture. In certain cases, the incorporation of large pores may be accomplished by fluidic additives, phases or solvents.

In summary, this invention describes a novel method for the preparation of separation materials, based on polymers, preferably polymer beads or resins, or other materials, that exhibit a highly defined pore structure. According to the present invention processes and methods for production of spherical beads or materials, useful as resins in the area of separation, are in the focus of the present invention. By using, for example, colloidal silica of a defined size and chemistry, the pore size of the final material may be predetermined. Different separation applications require resins or materials with different pore sizes. The present invention provides a possibility to control the pore size, within predefined ranges, e.g. a pore size of at least 50 Ångström, more preferably at least 100 Ångström. Additionally the present invention also provides resins and material which have a narrow pore size distribution, such as is illustrated in FIG. 2c. FIG. 2c illustrates the pore size and pore size ditribution, analyzed by Nitrogen adsorption analysis, of a resin according to the present invention. Furthermore, by not including porogenic solvents in the monomer solution, undesirable and undefined pores are obviated rendering the material free of any undesired microporosity.

While the invention has been described in relation to certain disclosed embodiments, a person skilled in the art may foresee also other embodiments, variations, or combinations which are not specifically mentioned but are nonetheless within the scope of the present invention.

All references cited herein are hereby incorporated by reference in their entirety.

The present invention will now be described in more detail with reference to non-limiting examples.

EXAMPLE 1

Silanization of Colloidal Silica

To a 1000 ml two-neck round bottom flask, 21.0 g of silica (Aerosil, Degussa, Germany) and 120 ml of toluene were added and nitrogen bubbled for 10 min, and then 1 ml of distilled water was dropped very slowly under stirring with an overhead stirrer, and then stirring for 1 h. Approximately 14.5 ml (16.2 g) silane is dropped into the mixture and stirred for 10 min and 0.1211 g of p-toluenesulfonic acid monohydrate added and stirred for 45 min at RT, then refluxed for 24 h under nitrogen at 105° C. in an oil bath. After cooling, the solvent was removed and the silica obtained.

EXAMPLE 2

Bulk Polymerization

A monomer mixture of 10 g DVB (divinylbenzene), 2 g of styrene and 200 mg AIBN is prepared and 1-20 g of colloidal silica (Aerosil, Degussa) is added. A mixture is obtained which has to be gently stirred to reach a homogenous mixture. This thickened monomer silica mixture is then heated to 65° C. for 12 h. After polymerization, a polymer block is obtained, crushed to polymer chunks, ground, washed, sieved or elutriated and dried.

The polymer-silica composite granules are first swollen in a sufficient amount of acetone or any other appropriate solvent and then treated with an aqueous solution of sodium hydroxide that dissolves the incorporated silica. The resulting treated granules now have an ordered pore structure that is left behind from the dissolved silica colloids.

EXAMPLE 3

Suspension Polymerization (having a high cross-linkage)

A monomer mixture of 10 g DVB, 2 g of styrene and 200 mg AIBN is prepared and 5 g of colloidal silica (Aerosil, Degussa) is added. A silica-monomer mixture is obtained which may have to be gently stirred to reach a homogenous mixture. This silica-monomer mixture is then added to 100 ml water phase containing typically 2 w % of a suspension stabilizer (e.g. PVA) and, if required, other additives to stabilize the suspension at room temperature. The two-phase suspension system is then stirred to disperse the monomer mixture in order to form small polymer droplets and then heated to 65° C. for 12 h and then at 80° C. for 4 h. After completed polymerization, the polymer beads are harvested and then washed and, if required, fractionated by wet or dry sieving, elutriation or sedimentation into the desired particle size fraction and dried. The process is schematically depicted in FIG. 4.

This polymer-silica composite is first swollen and wetted in 50 ml of either acetone or other appropriate solvent and then treated with sodium hydroxide that dissolves the incorporated silica. The thus treated beads are now spherical, have an ordered pore structure that is left behind from the dissolved silica colloids.

EXAMPLE 4

Formation of Silica-aggregates and Subsequent Addition of Monomers

A continuous water phase (100 ml) containing typically 2% of a suspension stabilizer (e.g. PVA) and, if required, other additives is prepared, then 5 g of the colloidal silica (Aerosil, Degussa) is added and stirred to suspend it evenly. During this process, colloidal silica aggregates may form.

After thorough suspension, the monomer solution consisting of 10 g DVB, 2 g of styrene and 200 mg AIBN is added e.g. portion wise and the mixture is stirred until all monomer has been absorbed by the silica aggregates and the whole mixture is evenly dispersed in the system. The suspension is then heated to 65° C. for 12 h and then at 80° C. for 4 h. After completed polymerization, the polymer beads are harvested and then washed and, if required, fractionated by wet or dry sieving, elutriation or sedimentation into the desired particle size fraction and dried. The process is schematically illustrated in FIG. 4.

This polymer-silica composite is first swollen and wetted in 50 ml of either acetone or other appropriate solvent and then treated with an aqueous solution of sodium hydroxide that dissolves the incorporated silica. The thus treated beads are now spherical, have an ordered pore structure that is left behind from the dissolved silica colloids.

EXAMPLE 5

Semi-dry Polymerization 5 g of dry colloidal silica (Aerosil, Degussa) is weighed in a container and 0.1-5 ml of monomer mixture, consisting of styrene, divinylbenzene and initiator (molar ratio of 1:1:0.04), is added. The container is purged with nitrogen and then sealed. This semi-dry mixture is stirred (or agitated, or rolled) sufficiently to evenly distribute the monomer mixture thoroughly throughout the silica bed. The mixture is then initiated to polymerize by heating at 60° C. for 16 h and allowed to polymerise until the monomers have thoroughly cured. The silica is then removed by exposure to a solution of sodium hydroxide and the resulting polymer beads are washed and harvested.

EXAMPLE 6

Inverse Suspension using Native Colloidal Silica

A monomer mixture of 5 g ethyleneglycoldimethacrylate EGDMA, 2 g hydroxyethylmethacrlyate (EMA), 2 g of methacrylic acid (MAA) and 200 mg AIBN is prepared and 5 g of native colloidal silica is added. A thickened suspension is obtained which may have to be gently stirred to reach a homogenous mixture. This thickened monomer suspension is then added to a mineral oil, petrolether, heptane or similar phase (50 ml) containing typically 2% of a suspension stabilizer and, if required, other additives to stabilize the suspension at room temperature. Optionally, a radical scavenger can be added to the oil phase to suppress undesired polymerizations in the oil phase. This decreases the amount of uncontrolled polymerizations in the oil phase leading to small polymer fractions that are not useful as a stationary phase in common chromatography. The two-phase suspension system is then stirred to disintegrate the monomer mixture in order to form small polymer droplets and then heated to 65° C. for 12 h and then at 80° C. for 4 h. After completed polymerization, the polymer beads are harvested and then washed and, if required, fractionated into the desired particle size and dried.

This polymer-silica composite is first swollen in 50 ml acetone and then treated with an aqueous solution of sodium hydroxide that dissolves the incorporated silica. The resulting polymer beads are washed and harvested.

EXAMPLE 7

Preparation of Controlled Pore Size Polymer Resin (low cross-linkage materials)

Silica gel (3 g) (Aerosil, Degussa) and distilled water (30 ml) were added to a three-necked flask and the mixture was aerated with nitrogen gas for 30 min with gentle stirring. A mixture (3 ml) consisting of styrene, divinylbenzene and initiator (molar ratio of 1:1:0.04) followed by 10 ml of 0.35 wt % of aqueous PVA (MW 1000, 1 part; MW 1500, 25 parts) solution was added. The mixture was stirred at 700 rpm under flowing nitrogen for 24 hours and then kept at 75° C. for another 24 hours. The mixture was then cooled, filtered through a sintered glass filter and washed with 200 ml of water and 100 ml of methanol. The precipitate was then added to a mixture of 90 ml of a 5 M NaOH aqueous solution and 60 ml of methanol and stirred for 24 hours at room temperature to dissolve the template silica gel. The polymer particles were washed with water until the solution was neutral followed by 100 ml of methanol and, then dried under vacuum at room temperature. Typical polymer yields are above 90% and the silica is quantitatively removed as described in the previous examples.

EXAMPLE 8

Modification of Controlled Pore Size Resins to form Ion Exchange Materials

Step 1. Chloromethylation 2.7 g of trioxane and 12 ml of chlorotrimethylsilane are dissolved in 30 ml of chloroform and the solution was added to 3 grams of dry polymer material, prepared e.g. as in example 7. Then, 1.5 ml of $SnCl_4$ was added and the mixture stirred at 0° C. for 30 minutes and for another 2 h at room temperature under flowing nitrogen. The reaction mixture was added to a methanol-water mixture, filtered through a glass filter, and washed with methanol, T° F., water and methanol. The polymer beads were dried under vacuum.

Step 2. Conversion to Anion-Exchange Materials 2.0 g of chloromethylated resin is suspended in a mixture of 8 mL water and 2 mL N,N,N',N'-tetramethyl-1,6-diaminohexane. The particles are dispersed by sonication for 10 min and the mixture is then stirred at 60° C. for 4 h. The particles are filtered off on a glass filter, washed with water, 6 M HCl and water, and then dried overnight in vacuum. Other tertiary amines can also be used instead of N,N,N',N'-tetramethyl-1,6-diaminohexane.

EXAMPLE 9

Preparation of Mono-disperse Beads with Narrow Pore Size Distributions

A 0.83 ml latex suspension (obtained by an emulsifier-free emulsion polymerisation) in water (0.1 g/ml) is swollen with a microemulsion consisting of 0.48 ml of dibutyphtalate, 0.02 g of SDS and 5 ml distilled water. This mixture is allowed to swell for 15 h with stirring at 125 rpm until the oil microdroplets disappear completely. To the swollen particles, 1-10 g colloidal silica (Aerosil, Degussa) dispersed in 20 ml distilled water containing 2% PVA are added and allowed to be absorbed under stirring by the swollen polymer droplets. Cross-linkers (5 ml EDMA), monomers (1 ml methacrylic acid), 0.25 g AIBN 0.02, g SDS, 2% PVA in 20 ml are added and also allowed to be absorbed by the formed droplets while stirring. Optionally, the particles are swollen further to increase the particle size. The monomers inside the formed particles are then polymerised at 50° C. under nitrogen atmosphere with slow stirring for 24 h. A dispersion of polymerised beads are thus obtained and poured into 250 ml water, filtered, then washed by suspension-filtration cycles 3 times with methanol and 2 times with tetrahydrofuran and 2 times with acetone. The obtained particles are then whetted with acetone, treated with ammoniumhydrogen difluoride to remove the sacrificial fillers, washed and harvested to yield monodisperse polymer particles with defined pore structures.

EXAMPLE 10

Preparation of a Monolithic Column with Defined Pore Size Distributions

A suspension of silica (3 g, Aerosil, Degussa) in 3 ml styrene, divinylbenzene and AIBN (molar ratio of 1:1:0.04) is poured into a stainless-steel column (dimensions, 4.6 mm inner diameter, 10 cm height) that is sealed on one end. After filling of the column the other side is also sealed and the column is allowed to polymerize. After completed polymerization, by for example heat, the column is washed with methanolic sodium hydroxide to remove the sacrificial filler and to wash the column.

EXAMPLE 11

Preparation of a Membrane with Narrow Pore Size Distributions

A suspension of silica (3 g, Aerosil, Degussa) in 3 ml styrene, divinylbenzene and AIBN (molar ratio of 1:1:0.04) is cast into a petridish mould that is then sealed with a lock. After filling and sealing, the polymer is allowed to polymerize by e.g. heat or UV irradiation. After completed polymerization, the obtained membrane is treated and washed with aqueous sodium hydroxide to remove the sacrificial filler, as described in Example 7, and to wash the membrane. This or similar processes yield membranes and flat formats with defined pore size structures.

EXAMPLE 12

Preparation of a Material Made by Moulding Techniques with Defined Pore Size Distributions The sacrificial silica is admixed to a polypropylene (PP) granules that is then further processed in moulding devices for injection, extrusion or blow moulding or calendaring to produce forms and shapes of desired designs. To 10 g of PP granules, 0.1-100 g of colloidal silica is admixed in the dry state and fed into the machinery; the PP silica mixture is pumped through various tools of the moulding apparatus to give a mould of desired size and shape. Alternatively, the preformed polypropylene (or polyethylene or other polymer) can be pressed or sintered to desired shapes and forms.

After shape formation and further (mechanical, physical or chemical) process steps, the sacrifical filler is removed with appropriate methods, as described in Example 7, to yield a material with a desired shape and a defined pore size distribution.

EXAMPLE 13

Preparation of a Molecularly Imprinted Polymer using Colloids as Pore Forming Agent 5 g of dry colloidal silica (Aerosil, Degussa, Germany) is weighed in a container and 0.1-5 ml of a molecular imprinting monomer mixture consisting of ethyleneglycol dimethacrylate, methacrylic acid, propranolol and optionally chloroform is added. The container is purged with nitrogen and then sealed. The mixture is mixed sufficiently to evenly distribute the monomer mixture thoroughly throughout the silica bed. The mixture is then initiated to polymerize by heat, UV radiation or another method and allowed to polymerise until the monomers have thoroughly cured. The silica is then removed by treatment with an aqueous solution of ammonium hydrogen difluoride and the resulting polymer beads are washed and harvested.

The invention claimed is:

1. A method for making cross-linked polymer bead material, having an interconnected network of pores and a narrow pore size distribution, comprising:
   a) providing, and optionally mixing, monomers and optionally additives, in the presence of a first population of non-porous colloidal particles wherein the monomers are selected from acrylic, vinylic and styrenic monomers,
   b) dispersing the mixture in a dispersing medium, forming monomer droplets comprising the colloidal particles,
   c) polymerizing and cross-linking said monomer droplets comprising said colloidal particles, and
   d) removing said colloidal particles from the formed polymer heads, wherein said colloidal particles are hydrophobic, said monomers are hydrophobic and said dispersion medium is hydrophilic, or said colloidal particles are hydrophilic, said monomers are hydrophilic and said dispersion medium is hydrophobic; and the polymer bead material is essentially free of micropores.

2. A method for making polymer material according to claim 1, wherein the hydrophilic dispersion medium is selected from the group consisting of water, alcohols, dimethylformamide, acetonitrile, dimethylsulfoxide, organic acids, amides, organic bases and ketones, other polar organic solvents or any combination thereof.

3. A method for making polymer material according to claim 1, wherein the hydrophobic dispersion medium is selected from the group consisting of mineral oil, aromatic or aliphatic cyclic compounds, petrolether, alkanes and halogenated solvents or any combination thereof.

4. A method for making polymer material according to claim 1, wherein colloidal particles have the same or different properties, such as size, surface chemistry and density.

5. A method for making polymer material according to claim 1, wherein the colloidal particles have a diameter up to 500 nm.

6. A method for making polymer material according to claim 1, wherein the formed polymer beads include a pore size and pore size distribution corresponding to the colloidal particle size and particle size distribution.

7. A method for making polymer material according to claim 6, wherein said pore size is at least 50 Angstrom.

8. A. method for making polymer material according to claim 1, wherein the surface of said colloidal particle is charged, neutral, acidic, basic, polar, non-polar, hydrophilic, hydrophobic, chiral, acrylic, styrenic, or biomimetic.

9. A method for making polymer material claim 1, wherein the colloidal particles are selected from colloidal silica, latex, crystal molecules, biominerals or any other organic, inorganic or biological colloidal entity or any mixture thereof.

10. A method for making polymer material according claim 1, wherein the colloidal particles include a surface and a template molecule at the surface of the colloidal particles.

11. A method for making polymer material according to claim 1, wherein a template molecule is added in step a).

12. A method for making polymer material according to claim 1, wherein the incorporated colloidal particles are removed by agents selected from fluoride compounds, alkaline or acidic chemicals.

13. A method for making polymer material according to claim 1, wherein said materials is ionic, chiral, polar, hydrophobic, biomimetic, catalytical, has reactive properties, or any combination thereof, or has affinity properties.

14. A polymer material produced according to the method of claim 1, used in separation; extraction; detection; catalysis; diagnostics; entrapment applications, such as entrapment of chemicals such as metal ions, inorganic compounds, drugs, carbohydrates, fats, peptides, proteins, nucleic acids, natural and artificial polymers, natural or artificial compounds, food or pharma products, viruses, bacteria, cells and other entities; or enrichment applications such as chromatography, batch separations, sensor applications, filters, membranes, controlled release materials, catalysts, biomimetic materials, thermodynamic traps and entrapment matrices.

15. A polymer material produced according to the method of claim 1, wherein said polymer material is used as packing material in chromatographic columns.

16. The polymer material of claim 14, wherein a second non-porous silica material having a larger diameter is added before polymerization.

17. The polymer material of claim 14, wherein highly ordered solids or semisolid materials are added before polymerization.

18. A method for making polymer material according to claim 1, wherein a second population of colloidal particles having a larger diameter than the first colloidal particles is added before polymerization.

19. A method for making polymer material according to claim 1, wherein highly ordered solids or semisolid materials are added before polymerization.

* * * * *

UNITED STATES PATENT AND TRADEMARK OFFICE
CERTIFICATE OF CORRECTION

PATENT NO. : 8,481,603 B2  
APPLICATION NO. : 12/085260  
DATED : July 9, 2013  
INVENTOR(S) : Yilmaz et al.

Page 1 of 1

It is certified that error appears in the above-identified patent and that said Letters Patent is hereby corrected as shown below:

IN THE CLAIMS:

In column 18, line 25, in claim 1, delete "heads" and insert --beads--, therefor In column 18, line 55, in claim 8, delete "A." and insert --A--, therefor In column 18, line 59, in claim 9, before "claim", insert --according to--, therefor In column 18, line 63, in claim 10, after "according", insert --to--, therefor Signed and Sealed this
Tenth Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,481,603 B2
APPLICATION NO.    : 12/085260
DATED              : July 9, 2013
INVENTOR(S)        : Ecevit Yilmaz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this
Thirteenth Day of May, 2014

Michelle K. Lee
*Deputy Director of the United States Patent and Trademark Office*